United States Patent
Arora et al.

(10) Patent No.: US 7,894,938 B1
(45) Date of Patent: Feb. 22, 2011

(54) VENDING MACHINE SERVICE SCHEDULING

(75) Inventors: Mandeep Singh Arora, Danville, CA (US); Anant Agrawal, Diamond Bar, CA (US); Fred Cheng, Aliso Viejo, CA (US); Eric Matthew Chu, Laguna Niguel, CA (US); Amedee Louis Beaudoin, Oakland, CA (US)

(73) Assignee: Cantaloupe Systems, Inc., San Francisco, CA (US)

( * ) Notice: Subject to any disclaimer, the term of this patent is extended or adjusted under 35 U.S.C. 154(b) by 238 days.

(21) Appl. No.: 11/096,889

(22) Filed: Mar. 31, 2005

(51) Int. Cl.
*G07F 17/00* (2006.01)
(52) U.S. Cl. .................... 700/241; 705/28; 705/9; 701/200; 701/202
(58) Field of Classification Search ......... 700/231–244; 705/28, 9; 235/375–378; 701/200, 202
See application file for complete search history.

(56) References Cited

U.S. PATENT DOCUMENTS

| | | | | |
|---|---|---|---|---|
| 5,207,784 A * | 5/1993 | Schwartzendruber | .......... | 221/6 |
| 5,608,643 A * | 3/1997 | Wichter et al. | .............. | 700/244 |
| 5,844,808 A * | 12/1998 | Konsmo et al. | ............. | 700/244 |
| 5,897,629 A * | 4/1999 | Shinagawa et al. | ............ | 706/13 |
| 5,983,198 A * | 11/1999 | Mowery et al. | ................ | 705/22 |
| 6,181,981 B1 * | 1/2001 | Varga et al. | .................. | 700/236 |
| 6,421,605 B1 * | 7/2002 | Steiner et al. | ............... | 701/209 |
| 6,980,887 B2 * | 12/2005 | Varga et al. | .................. | 700/236 |
| 7,076,329 B1 * | 7/2006 | Kolls | .......................... | 700/232 |
| 7,097,099 B2 * | 8/2006 | Hepworth et al. | ........... | 235/435 |
| 7,181,501 B2 * | 2/2007 | Defosse | ...................... | 709/217 |
| 7,251,612 B1 * | 7/2007 | Parker et al. | .................... | 705/9 |
| 2002/0065700 A1 * | 5/2002 | Powell et al. | ................... | 705/9 |
| 2004/0117196 A1 * | 6/2004 | Brockman et al. | ............. | 705/1 |
| 2005/0236253 A1 * | 10/2005 | Shur | .......................... | 194/200 |
| 2007/0127429 A1 * | 6/2007 | Bryan et al. | ................. | 370/338 |

* cited by examiner

*Primary Examiner*—Gene Crawford
*Assistant Examiner*—Michael K Collins
(74) *Attorney, Agent, or Firm*—Haynes and Boone, LLP; Michael Shenker

(57) ABSTRACT

Techniques are provided for calculating vending machines' service priorities and scheduling the vending machines for service taking into account a number of factors and thresholds (520). In some embodiments, the machines (110) are subdivided into subroutes (320). Each subroute has one or more machines, and at least one subroute has a plurality of machines. The vending machine service schedule is generated by selecting the highest priority subroute (410) and selecting the machines in that subroute (420). Other subroutes can be selected (430, 440) if there is time left in the Service Period.

69 Claims, 6 Drawing Sheets

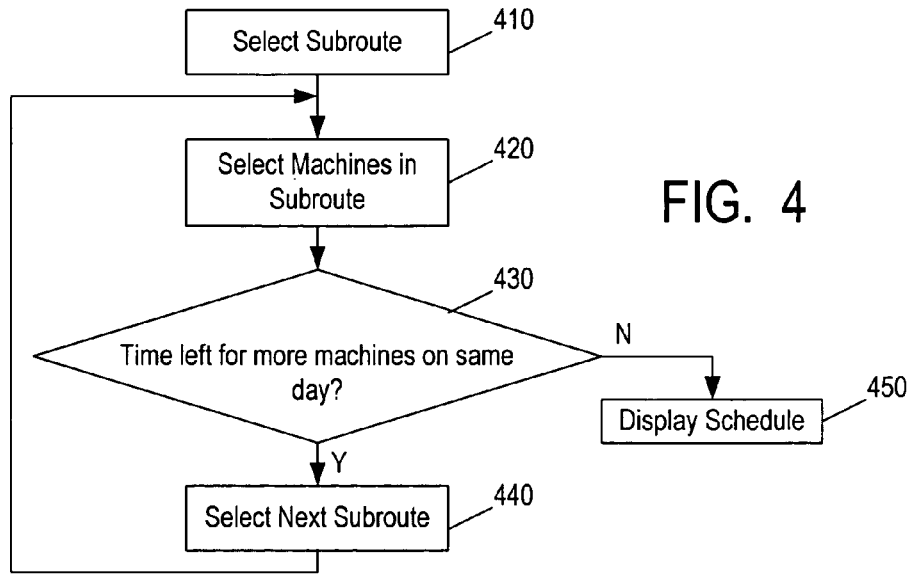
FIG. 4
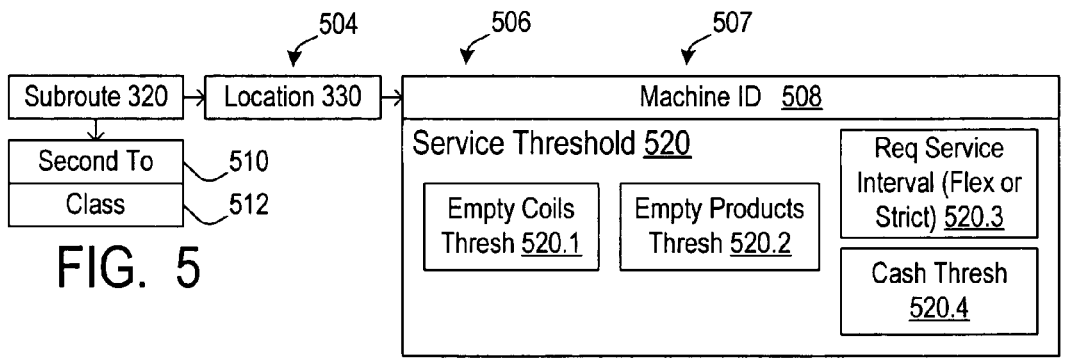
FIG. 5
| Coil Name | Stock Level | Inventory | Alert Level | Daily Average | Product UPC | Days To Empty |
|---|---|---|---|---|---|---|
| A1 | 15 | 12 | 2 | 2.5 | UPC1 | 4 |
| A2 | 15 | 7 | 2 | 2.5 | UPC1 | 2 |
| A3 | 15 | 4 | 1 | 3 | UPC2 | 1 |
| A4 | 15 | 7 | 1 | 2 | UPC3 | 3 |
| B1 | 20 | 15 | 0 | 3 | UPC4 | 5 |
| B2 | 20 | 8 | 0 | 4 | UPC5 | 2 |
| C1 | 40 | 32 | 0 | 4 | UPC6 | 8 |
| C2 | 40 | 20 | 0 | 2 | UPC7 | 10 |
| C3 | 40 | 12 | 0 | 1 | UPC8 | 12 |
| C4 | 40 | 8 | 0 | 4 | UPC9 | 2 |
FIG. 6

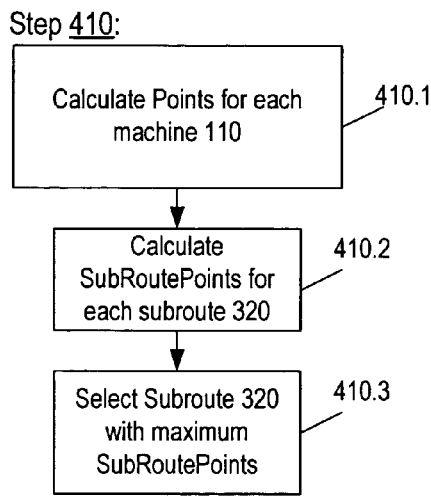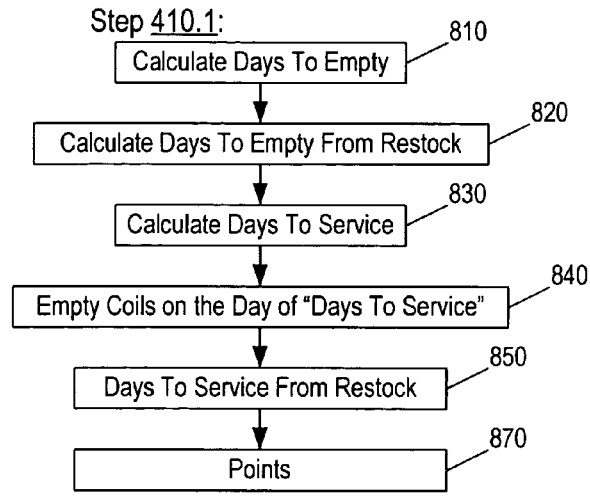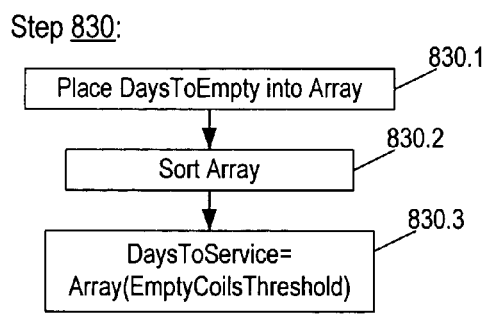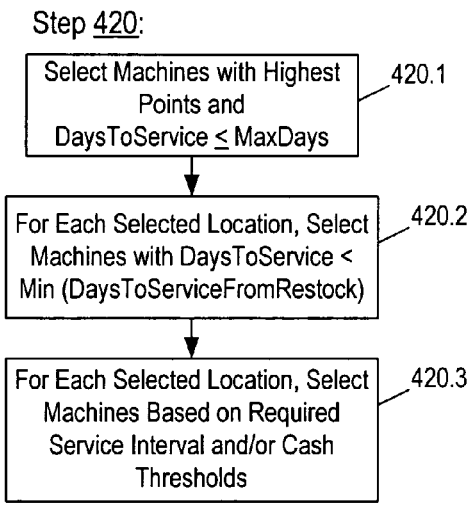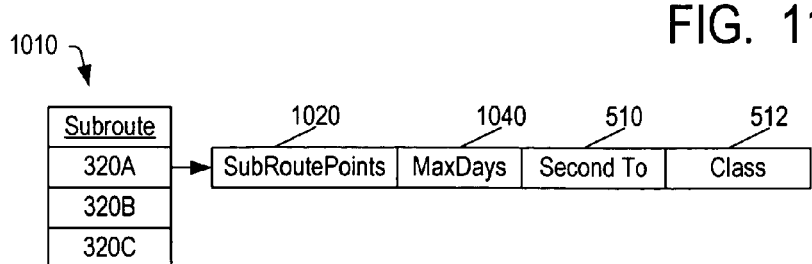

Rankings

| Rank | SubRoute | Total Points | Average Points | Max Days | Second To |
|---|---|---|---|---|---|
| 1 | 1: Orange County, | 11.78 | 0.62 | 4 | None |
| 2 | 4: South San Diego, | 9.96 | 0.62 | 4 | None |
| 3 | 3: North San Diego, | 6.84 | 0.49 | 4 | 2, 4 |
| 4 | 2: Oceanside, | 3.95 | 0.56 | 4 | 1, 3 |

Subroute 1: Orange County

| | | | Scheduler | | Empty Products | Days | Restock | |
|---|---|---|---|---|---|---|---|---|
| | ID | Location | Prev | Next | | | Last | From Today |
| ☐ | 12428 | Boys & Girls Club | | | 3 | 10 | 2/16 | 3/9 |
| ☐ | 4178 | La Habra High School | | Fri | 3 | 8 | 2/16 | 3/7 |
| ☐ | 4154 | Sonora High School | | | 3 | 13 | 2/16 | 3/14 |
| ☑ | 13179 | Sonora High School | | | 3 | 3 | 2/16 | 3/9 |

FIG. 12

Coil A1:   Par Level: 20

| Date: | March 1, 2000 | March 2, 2000 | March 3, 2000 | March 4, 2000 | March 5, 2000 | March 6, 2000 |
|---|---|---|---|---|---|---|
| Items Sold: | 2 | 4 | X | X | 2 | 2 |

FIG. 13

Coil A1:   Par Level: 20

| Date: | March 1, 2000 | March 2, 2000 | March 3, 2000 | March 4, 2000 | March 5, 2000 | March 6, 2000 |
|---|---|---|---|---|---|---|
| Items Sold: | 2 | 4 | 2 | 2 | X | X |

FIG. 14

Coil A1:   Par Level: 20   Alert Level: 2

| Date: | March 1, 2000 | March 2, 2000 | March 3, 2000 | March 4, 2000 | March 5, 2000 | March 6, 2000 |
|---|---|---|---|---|---|---|
| Items Sold: | 6 | 10 | 2 | 2 | 4 | 4 |

FIG. 15

VENDING MACHINE SERVICE SCHEDULING

BACKGROUND OF THE INVENTION

The present invention relates to vending machines, and more particularly to scheduling vending machine service to have the vending machines restocked.

Vending machines should be restocked promptly to ensure maximum sales and customer satisfaction. On the other hand, too frequent restocking involves wasteful service calls by service personnel.

To facilitate optimum restocking, vending machines 110 (FIG. 1) can be equipped to report the inventory and sales data to a computer data base system 120 over a network 130. Vending machine owners use computer systems 140 to connect to a computer server 150 via the Internet using World Wide Web. Server 150 accesses the data base 120 and provides the owner's client system 140 with data received from the owner's vending machines 110. The owner can use the data to schedule the vending machines for the restocking service.

Improved vending machine service scheduling methods are desirable.

SUMMARY

This section summarizes some features of the invention. Other features are described in the subsequent sections. The invention is defined by the appended claims which are incorporated into this section by reference.

Due to service personnel limitations, it may be impossible or difficult to service all the machines at the same time or even on a single day. Some machines must be selected for service in preference to other machines. This selection can be difficult due to different factors that may have to be taken into account. For example, some machines may run out of a few products but be adequately stocked with other products for days to come. Other machines may be stocked with all of the products but if the product quantity is low then many products may run out quickly. Some embodiments of the present invention provide techniques for calculating the service priority for the vending machines taking a number of factors into account. Some embodiments provide fast and simple computation techniques easily implemented with a computer.

Further, the inventor has observed that if the machines are scattered over a large geographical area, it may be more efficient to service machines with a lower service priority before higher priority machines. For example, suppose that machines A and B have the highest service priority (say, they are almost empty) but they are far from each other. It may be more efficient to service the machine A and its adjacent machines on a given day, and service the machine B on a different day, even though the machines adjacent to A have a lower priority than B. Therefore, in some embodiments, the machines are subdivided into "subroutes". Each subroute has one or more machines, and at least one subroute has a plurality of machines. In the example above, the machine A and its adjacent machines can be one subroute, and the machine B and its adjacent machines can be another subroute. The service schedule for a given day is generated by selecting the highest priority subroute and selecting the machines in that subroute. Other subroutes can be selected if there is time left in the day after servicing the first subroute. Each subroute can be a group of adjacent machines, or a group of machines positioned so as not to require an inordinate travel time between the machines. For example, a subroute may contain machines located far from each other but interconnected by a high speed road.

Also, if the service schedule generation takes into account the vending machines' locations and the driving times between the machines, the schedule generation may be too slow for a given computing power. Therefore, in some embodiments, simplified assumptions are made regarding the driving times. For example, in some embodiments, each machine is assumed to require the same fixed service time (including any driving time). The subroutes can sometimes be configured to generate good schedules with this assumption (if, for example, the driving time differences are negligible within each subroute.) The invention is not limited to any subroute configuration however.

The invention is not limited to the features and advantages described above. Other features are described below. The invention is defined by the appended claims.

BRIEF DESCRIPTION OF THE DRAWINGS

FIG. 4 is a flowchart of a method used in some embodiments of the present invention.

FIGS. 5 and 6 illustrate computer data bases according to some embodiments of the present invention.

FIGS. 7, 8, 9 are flowcharts of methods of some embodiments of the present invention.

FIG. 10 illustrates a computer data base according to some embodiments of the present invention.

FIG. 11 is a flowchart of a method of some embodiments of the present invention.

FIG. 12 illustrates a computer display of vending machine scheduling information according to some embodiments of the present invention.

FIGS. 13, 14, 15 illustrate computer data bases according to some embodiments of the present invention.

DESCRIPTION OF SOME EMBODIMENTS

The embodiments described in this section illustrate but do not limit the invention. The invention is defined by the appended claims.

Figure 1:
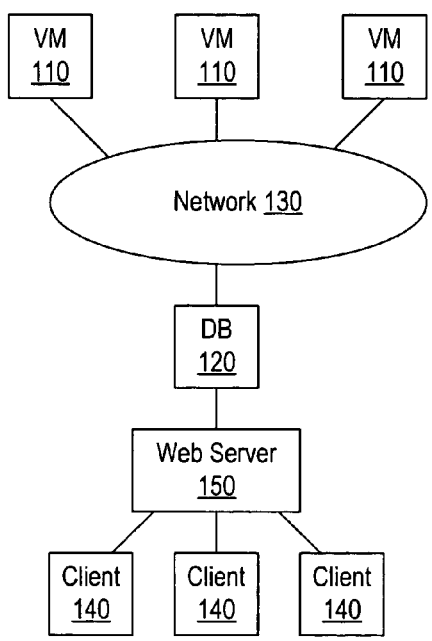
FIG. 1 is a block diagram representing a prior art vending machine monitoring system and also representing some embodiments of the present invention.
Figure 2:
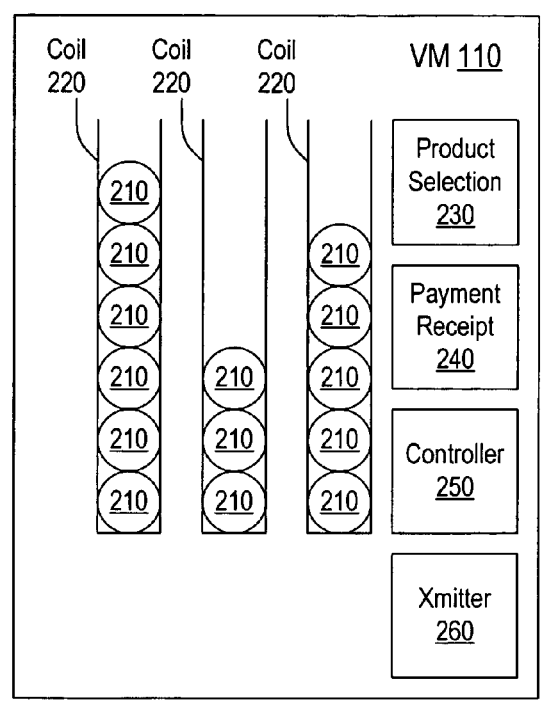
FIG. 2 is a block diagram of a vending machine.

FIG. 2 is a block diagram of a vending machine 110 suitable for some embodiments of the present invention. The invention can be implemented on a system configured as in FIG. 1, with the vending machine service schedules generated by client systems 140 and/or server 150 according to some embodiments of the present invention. Network 130 may include a wireless connection to the vending machines (e.g. a cellular telephone connection). The invention is not limited to the system configuration of FIG. 1 or the vending machine type shown in FIG. 2 however. The vending machine of FIG. 2 stores product items 210 (e.g. drinks, chewing gum, stamps, sandwiches, or any other kind) in product containers 220. Containers 220 can be coils, columns, bins, or any other kind, known or to be invented. The term "coil" will be used herein as synonymous with "product container". A vending machine user selects a desired product via a product selection unit 230 (a push button pad or some other kind), and pays for the product via a payment unit 240. Payment unit 240 may include a cash receiving device and a display showing the amount of money to be deposited, a credit card reader, and/or other payment mechanisms. Vending machine controller 250 includes counters (not shown) for counting the units 210 sold from each coil 220 and for keeping track of the payments. Controller 250 also includes computerized equipment (not shown) for polling the counters and accumulating the sales data for regular periods of time (e.g. each hour). The sales data may include the number of units 210 sold from each coil 220 in that hour, the payment amounts, and/or other data. A transmitter 260 periodically transmits the data to data base 120 (FIG. 1). Prior art vending machines can also be used. See for example U.S. Pat. No. 5,207,784 issued May 4, 1993 to Schwarzendruber, and U.S. Pat. No. 6,181,981 issued Jan. 30, 2001 to Varga et al., both incorporated herein by reference.

To service the vending machines 110, a driver obtains supplies at a home office 310 (FIG. 3) and restocks a number of vending machines per day. In some embodiments, a client system 140 at office 310 generates a service schedule (the list of vending machines to service) for each day taking into account the sales and inventory data. In some embodiments, the service schedule is generated by a computer program executed by the client's computer processor (or processors) 140P using the client's memory 140M which stores the computer program instructions executed by processor 140P and also stores pertinent data. Client 140 is shown as located in office 310, but this is not necessary. Client 140 can be a distributed system. Some or all of the service schedule generation can also be performed by server 150 (shown with a processor or processors 150P and memory 150M). The term "memory" includes random access volatile and non-volatile memory, magnetic and optical disks, and any other kind of computer storage, known or to be invented, and combinations of different kinds of memory. These memory kinds will also be referred to as "computer readable media" herein. It will be assumed herein that all the data values and data bases can be stored in such memory or media, though other, non-computer-readable storage is also possible. The invention can be implemented with software and/or hardwired circuitry.

Figure 3:
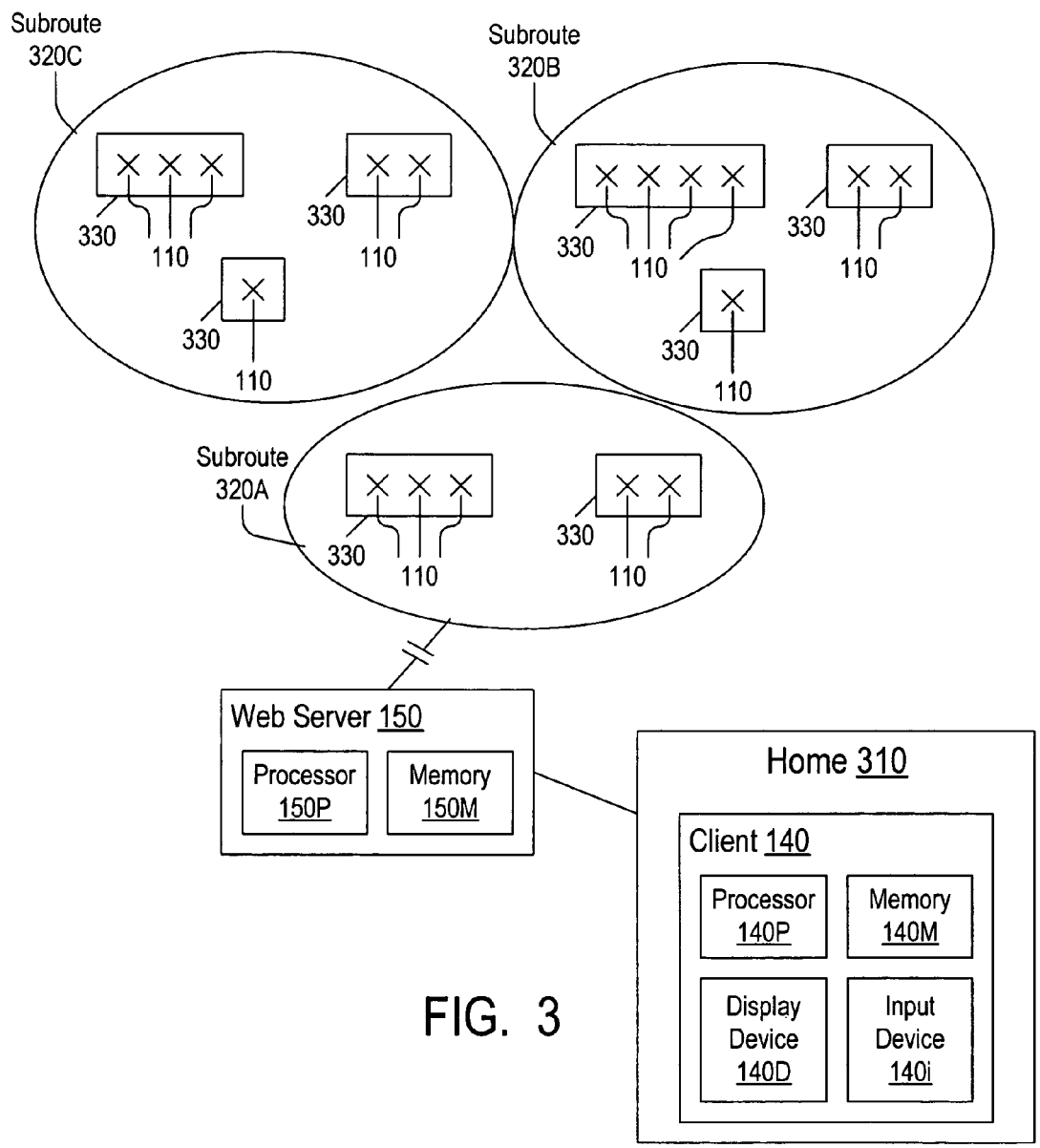
FIG. 3 is illustrates vending machine subroutes in some embodiments of the present invention.

The vending machines can be scattered over a large geographical area. It may be more efficient to service a group of adjacent machines together before servicing another group of machines. In FIG. 3, machines 110 are grouped into subroutes 320 (such as 320A, 320B, 320C). Each subroute contains at least one machine 110. One or more of the subroutes contain a number of machines each. The service schedule is generated by first selecting a highest priority subroute (step 410 in FIG. 4), and selecting the machines in the selected subroute (step 420). In some embodiments, the subroutes help simplify the schedule generation by allowing simplified assumptions with regard to the time of servicing the vending machines. It may take too much time and/or computing power to precisely account for the driving times between different vending machines. Therefore, in some embodiments, it is assumed that each vending machine service requires a fixed amount of time, the same for all the vending machines. The subroutes can be organized to make this assumption more realistic if the driving time differences are negligible within each subroute.

A more complex model can also be chosen. For example, in addition to the fixed time for servicing each vending machine, additional driving time can be allocated for driving to the first machine of each subroute. This additional time may be different for different subroutes. Also, as shown in FIG. 3, a group of vending machine may be present at each location 330 such as a school building, a shopping mall, etc. In some embodiments, a fixed amount of service time (say, T1), is assumed for one vending machine 110 at each location 330, and a smaller amount T2 for each additional vending machine at the same location.

A subroute does not have to be in a contiguous area. Machines distant from each other but interconnected by a high speed highway may be placed in the same subroute, with another subroute between those machines. The subroutes can be generated manually by the user of system 140, or automatically by a system that examines the driving times between different locations 330. The invention is not limited to any subroute generation or configuration or to the advantages described herein.

FIG. 4 illustrates an exemplary service schedule generation method performed by client 140 and/or server 150. The vending machine inventory and sales data are examined to select a subroute 320 (step 410) for service on a particular day ("Service Day"). Then the vending machines are selected for service in that subroute (step 420). At step 430, a test is performed to determine if there is time left for servicing another vending machine on the same day. If so, another subroute is selected (step 440), and step 420 is repeated for that subroute. This loop is repeated until either there is no time left for servicing another machine (as determined at step 420 or 430), or there is no other subroute to select (step 440). Then the schedule is provided on an output device 140D (FIG. 3) of client system 140 (step 450). Output device 140D may be a display device (e.g. a computer monitor or a printer), an audio speaker, or any other device generating signals intelligible to a human being. The user is allowed to make adjustments to the schedule by using an input device 140i (e.g. a keyboard, a mouse, a voice recognition system, etc.). The adjustments may involve selecting or deselecting a vending machine for service, or changing some scheduling parameters (e.g. the MaxDays parameter 1040 of FIG. 10 as described below) and regenerating the schedule (steps 410-440).

FIGS. 5 and 6 illustrate data bases or structures in memory 140M and/or 150M used in some embodiments by the method of FIG. 4. The data structure of FIG. 5 associates each subroute 320 with a list 504 of the subroute's locations 330. Each location 330 is associated with a list 506 of vending machines 110 at that location. The locations 330 can be specified using any suitable codes. Location names can be used that are meaningful to the user, e.g. "Sonora High School". The vending machines at each location can be described by a vending machine structure 507 which includes a machine ID 508 identifying the machine. ID 508 can be hardwired into the machine and transmitted by the machine to database system 120 (FIG. 1).

In addition, each subroute 320 is associated with a "Second To" (or "SecondTo") list 510. This is a list of other subroutes each of which can immediately precede the subroute 320 in the list of subroutes serviced on the same day. Exemplary "Second To" lists for FIG. 3 are shown below in Table 1.

TABLE 1

| | "SECOND TO" | |
|---|---|---|
| Subroute | Second To | Class |
| 320A | 320B, 320C | 3 (tertiary) |
| 320B | 320C | 2 (secondary) |
| 320C | None | 1 (primary) |

In Table 1, subroute 320A can be the next subroute serviced after subroute 320B or 320C on the same day. Subroute 320B can be the next after subroute 320C but not after subroute 320A. The reason for this may be that the subroute 320B is farther from office 310 than subroute 320A and it would be inefficient for the driver to go from subroute 320A to subroute 320B. For the same or some other reasons, subroute 320C cannot be serviced after any other subroute. The "Second To" data can be generated by the user manually or automatically using some criteria. The invention is not limited to any criteria or "Second To" lists.

In addition, each subroute is associated with a Class parameter 512. Exemplary class parameters are shown in Table 1. In one embodiment, the class value can be 1 (for a "primary" subroute), 2 (for a "secondary" subroute), or 3 ("tertiary" subroute). A primary subroute (class 1) is a subroute which is Second To None and thus must be the first to be serviced, if at all, on any given day. This may be because the subroute is a great distance from home 310, or is very large, but these factors are not limiting. A secondary subroute (such as subroute 320B) can be either the first serviced subroute or can be serviced after another subroute on any give day. The tertiary subroutes (class 3) are those that cannot be the first serviced subroutes but can only be serviced after another subroute on any given day. These could be smaller subroutes close to home 310 that the user only wants to be selected as extra work at the end of the day.

Some embodiments do not have the class indicators. In other embodiments, the class indicators are present but the SecondTo lists are omitted. In some such embodiments, a secondary subroute is assumed to be Second To any primary or secondary subroute. A tertiary subroute is assumed to be Second To any other subroute. The Second To lists are thus not needed. Other class indicators can also be used to indicate a subroute service priority.

The pictorial data representations such as that of FIG. 5 do not imply herein any particular data organization unless noted otherwise. The term "list" (such as list 504) can indicate a linked list, an array, or any other data organization from which the locations 330 can be recovered. For example, the data base of FIG. 5 can include quadruples of data items <subroute name, location 330, machine ID, pointer to SecondTo list 510> for each machine 110. A data base or structure can be part of another data base or structure.

Each machine is associated with a Service Threshold parameter or parameters 520 indicating some threshold that the machine should reach before being served. The following parameters are illustrated in FIG. 5:

Empty Coils Threshold 520.1 is a threshold for the number of empty coils 220 in the machine. The machine will receive a higher service priority if the number of empty coils reaches the Threshold 520.1, as described below.

Empty Products Threshold 520.2. The machine will receive a higher service priority if the number of empty products in the machine reaches the Threshold 520.2.

Required Service Interval 520.3 is the maximum time that the machine should be allowed to operate without service. The Required Service Interval can be flexible (giving a somewhat higher service priority to the machine) or strict (giving a highest service priority to the machine). A strict parameter may be desirable, for example, if the machine sells perishable food or some dangerous condition may develop in the machine. The invention is not limited to a particular parameter usage, and the threshold parameters can be set by the user as desired. Some embodiments use both a flexible Required Service Interval and a strict Required Service Interval.

Cash Threshold 520.4 is a threshold for the amount of cash in the machine. The amount of cash is calculated from data periodically sent by the machine to database 120. The machine gets a higher service priority if the amount of cash reaches the threshold 520.4.

Some embodiments do not use all of the threshold parameters shown in FIG. 5. Some embodiments use threshold parameters not shown in FIG. 5. The exemplary embodiment described immediately below uses the empty coils threshold 520.1 but not necessarily any other thresholds. Also, while FIG. 5 may suggest that a separate threshold parameter is defined for each vending machine, a threshold parameter can be defined for a whole subroute to apply to all the machines in the subroute, or for a location, or for some group of machines, or for all of the machines.

FIG. 6 illustrates a data base used by the method of FIG. 4 for each vending machine 110. For each coil 220 (FIG. 2) in machine 110 (the coils are indicated by the "coil name" parameter), the data base specifies:

1. Inventory (current number of items in the coil).

2. Stock Level ("StockLevel"), also called "Par Level" (the number of items in the coil when the coil has just been restocked).

3. Alert Level ("AlertLevel"). The coil is considered empty when the inventory drops to the alert level, which may be positive rather than zero. This is because some vending machines cannot empty a coil and they stop vending when there is still some number of items in the coil. That number of items is the "alert level".

4. Daily Average ("DailyAverage"), computed as the average sales (i.e. number of items sold) per day from that coil. In some embodiments, the Daily Average is taken over the past 60 days. In some embodiments, a weighted average is used, with the recent sales weighted more heavily than the older sales. In some embodiments, the Daily Average is cleaned up to account for faulty data received from the vending machine as described below.

5. Product ID. In this example, a Universal Product Code (UPC) is used, but this is not limiting.

6. Days To Empty ("DaysToEmpty") computed at step 410 as described below.

FIG. 7 illustrates an example implementation of the subroute selection at step 410. This implementation is based on calculating the service priority for each vending machine. The service priority is expressed as a real number referred to as "Points" herein. At step 410.1, the Points are calculated for each vending machine 110 from the data of FIG. 6. An exemplary computation is shown in FIG. 8 and described below. At step 410.2, the total points "SubRoutePoints" are computed for each subroute 320. At step 410.3, the subroute is selected with the maximum number of points. In embodiments using the Class parameter 512 (FIG. 5 and Table 1) only the primary and secondary subroutes are considered at this step. If multiple subroutes have the maximum number of points, some additional criteria can be used to select one of such subroutes. For example, if one of such subroutes is a primary subroute, then the primary subroute can be selected, or the subroute can be selected as the first subroute with the maximum points in a predefined list of all the subroutes, or using some other criteria, known or to be invented.

Step 410.1—Points Computation for a Given Vending Machine (See FIG. 8).

Step 410.1—Sub-step 810: For each coil 220, calculate "DaysToEmpty". This is a forecast estimate of the number of days until the coil reaches its Alert Level ("AlertLevel"). The calculation can be:

$$\text{DaysToEmpty} = (\text{Inventory} - \text{AlertLevel}) / \text{DailyAverage}. \quad (1)$$

In some embodiments, DaysToEmpty is rounded to an integer. The rounding can be to the nearest integer, or it can be up or down. FIG. 6 provided exemplary DaysToEmpty values.

Other computation methods can also be used. For example, if the vending machine is inaccessible on weekends, the number of weekend days during the "DaysToEmpty" period can be added to DaysToEmpty to get a new DaysToEmpty value. In another example, the machine is accessible during the weekends, but the weekend sales are different from the week day sales. Then two separate daily averages can be computed, one for the week days and one for the weekends. Each day (say, day d1) beginning with today or tomorrow is then examined, and a running total for the number of items to be sold starting today or tomorrow is incremented by the daily average value for day d1 (i.e., depending on whether the day d1 is a work day or a weekend day). When the running total first reaches or exceeds the value (Inventory-AlertLevel) for the coil, the corresponding day d1 is considered to be the day when the coil will become empty. DaysToEmpty are computed as the number of days until that day d1 (including d1 or not including d1). In other embodiments, separate daily averages are kept for other day categories for which substantially different sales averages are expected. For example, separate categories can be created for summer weekends, summer week days, non-summer weekends, and non-summer weekdays, to get a more accurate DaysToEmpty estimate.

Step 410.1—Sub-step 820: In a similar fashion, a forecast estimate "Days To Empty From Restock" (or "DaysToEmptyFromRestock") is generated for the number of days until the coil becomes empty if it is restocked immediately. In one embodiment, $$\text{DaysToEmptyFromRestock} = (\text{StockLevel} - \text{AlertLevel})/\text{DailyAverage} \quad (2)$$

Other computational methods described above for DaysToEmpty can also be used for DaysToEmptyFromRestock. The invention is not limited to any computational methods.

Step 410.1—Sub-step 830: The DaysToEmpty data are used to generate "Days To Service" (or "DaysToService"). This is an estimate for the number of days until the machine will reach its Empty Coils Threshold 520.1 (FIG. 5). In some embodiments (FIG. 9), this is done as follows.

Step 410.1—Sub-step 830—Sub-sub-step 830.1: The DaysToEmpty data are placed in an array. For the example data of FIG. 6, the array is follows:

$$\text{Array} = [4, 1, 3, 5, 2, 8, 10, 12, 2] \quad (3)$$

In this array, if the same product is on multiple coils (e.g. coils A1 and A2), only the maximum DaysToEmpty is taken. Thus, the coil A2 data are omitted.

Step 410.1—Sub-step 830—Sub-sub-step 830.2: The array is sorted. For the example of FIG. 6, the sorted array is:

$$\text{Array} = [1, 2, 2, 3, 4, 5, 8, 10, 12] \quad (4)$$

Step 410.1—Sub-step 830—Sub-sub-step 830.3: DaysToService is calculated as Array (Empty Coils Threshold), where the array index varies from 1 to the number of coils. In the example above, Array(1)=1. If Empty Coils Threshold is 2 coils, then DaysToService=2.

Step 410.1—Sub-step 840 (FIG. 8): As seen from formula (4), if EmptyCoilsThreshold=2, then three coils will become empty on the day corresponding to DaysToService because Array(3)=Array(2). At step 840, "Empty Coils" (or "EmptyCoils") is calculated as the number of empty coils on the day corresponding to DaysToService. EmptyCoils is calculated as the index of the last array entry equal to Array(EmptyCoilsThreshold). For the example (4), EmptyCoils=3.

Step 410.1—Sub-step 850: The DaysToEmptyFromRestock data are used to generate "Days To Service From Restock" (or "DaysToServiceFromRestock"). This is an estimate for the number of days when the machine will reach its Empty Coils Threshold 520.1 if the machine is restocked immediately. In one embodiment, this computation is identical to step 830 except that DaysToEmptyFromRestock is used in place of DaysToEmpty.

The following table describes data structures available in memory 140M and/or 150M for each machine 110 at the conclusion of step 860:

TABLE 2

| Machine ID | Empty Coils | Days To Service | Days To Service From Restock |
|---|---|---|---|

Step 410.1—Sub-step 870: The service priority ("Points") is calculated for each machine as an increasing function of EmptyCoils and a decreasing function of DaysToService. In one embodiment, $$\text{Points} = \text{EmptyCoils}/(\text{DaysToService} + 1) \quad (5)$$

The inventor has found experimentally that the following formula gives superior results for differentiating the machines by their need of service:

$$\text{Points} = \text{EmptyCoils}^{0.5}/(\text{DaysToService}^{1.75} + 1) \quad (6)$$

In some embodiments, the Points are calculated as a function of DaysToService only, for example:

$$\text{Points} = 1/(\text{DaysToService} + 1) \quad (7)$$

The calculation (7) gives a higher priority to machines 110 with smaller DaysToService. EmptyCoils is not used, and step 840 is omitted. In formula (6), EmptyCoils is used to differentiate between machines with the same or similar DaysToService parameter. The DaysToService power of 1.5 is larger than the EmptyCoils power of 0.5 to give DaysToService a larger weight. The DaysToService power can be 2, and other powers and weighing techniques can also be used.

End of Step 410.1

In some embodiments, the Points computation takes into account other thresholds 520.2, 520.3, 520.4. For example, DaysToService can be calculated using Empty Products (the number of empty products in the machine) instead of Empty Coils. This is done by calculating DailyAverage in formula (1) as the average number of items of a product sold by the machine, and calculating the Inventory as a combined inventory for the product. The AlerLevel can be zero for example. In other embodiments, Points can be defined as some other increasing function of the number of empty products in the machine, or Points can be increased by some amount if the empty products number has reached the threshold 520.2. Likewise, Points can be increased if the time since the last service has reached the Required Service Interval 520.3. If this is a strict Required Service Interval, the Points can be set to some predetermined high value to increase the chances that the machine's subroute will be selected at step 410.3 (described below) and the machine itself will be selected at step 420 (FIG. 4). The amount of cash in the machine, or the fact that the machine has reached its Cash Threshold 520.4, can also be used to increase the Points value. The thresholds 520 can also be taken into account at other steps, such as step 420.3 (FIG. 11) described below. Other threshold handling is also possible.

In some embodiments, the following method is used. Suppose at first that DaysToService is calculated as described above for step 830.3, based on the Empty Coils Threshold 520.1. Denote this DaysToService value as DaysToService_1. Another DaysToService value DaysToService_2 is calculated in a similar way based on the number of empty products in the machine rather than empty coils, based on the Empty Products Threshold 520.2. Then DaysToService can be calculated as:

$$\text{DaysToService} = \min(\text{DaysToService\_1}, \text{DaysToService\_2}) \quad (8)$$

Other computations are also possible, giving different weights to DaysToService_1 and DaysToService_2. Also, DaysToService can be calculated as:

$$\text{DaysToService} = \min(\text{DaysToService\_1},$$

Days remaining till the machine reaches a flexible or strict

Required Service Interval 520.3) (9)

In another embodiment, DaysToService is calculated as the minimum of DaysToService_2 and the days remaining till the machine reaches a flexible or strict Required Service Interval, or as the minimum of DaysToService_1, DaysToService_2 and the days remaining till the machine reaches a flexible or strict Required Service Interval. Other computations of DaysToService can also be used, giving different weights to DaysToService_1, DaysToService_2, the number of days till the machine reaches a flexible Required Service Interval, and the number of days till the machine reaches a strict Required Service Interval. The DaysToService can also be a decreasing function of the cash amount in the machine, and/or DaysToService can be reduced if the machine has reached its Cash Threshold 520.4.

STEP 410.2 (FIG. 7): The Points are totaled for the vending machines in each subroute 320, to obtain SubRoutePoints for each subroute.

STEP 410.3: Subroutes 320 are sorted in the decreasing order of SubRoutePoints to generate a subroute list 1010 (FIG. 10). The top subroute is selected for service from all the primary and secondary subroutes.

FIG. 10 shows a data base used in some embodiments at steps 430 and 440 (FIG. 4). These data are stored in memory 140M and/or 150M, and include, for each subroute 320, the SubRoutePoints field 1020 (see FIG. 7, step 410.2), the SecondTo list 510, and Class 512 (see Table 1 above and FIG. 5). In addition, an optional "Maximum Days" (or "Max Days", or "MaxDays") field 1040 is provided. This is a user defined parameter which specifies the maximum period, in days, by which any machine 110 in the subroute can be pre-serviced in advance of DaysToService. Thus, in some embodiments, if the schedule is generated for today, then a machine can be serviced between the day (today+DaysToService−MaxDays) and (today+DaysToService) inclusive. Hence, if MaxDays<DaysToService, the machine will receive a lower service priority at step 420. For example, if the DaysToService is 4 but MaxDays=3, the machine will receive a lower service priority (no service at all in some embodiments).

Step 420 (FIGS. 4, 11) Select Vending Machines 110 in a Subroute.

Let "Service Day" be the day for which the service schedule is generated. This may be today, tomorrow, the next business day, or some other day. For example, the schedule can be generated in the morning of the Service Day, or in the evening of the day immediately before the Service Day. In some embodiments, step 420 is performed as follows (FIG. 11).

Step 420.1: Pick the machine 110 having the maximum Points among the machines which have not been selected and which have their DaysToService≦MaxDays. Add the machine to the Service List (the list of machines scheduled for service on the Service Day; the list is initialized to empty before the first iteration of step 420 in the loop of FIG. 4).

For each machine 110 added to the Service List, for the machine's location 330, calculate Min(DaysToServiceFromRestock) amongst all the machines at the location. This minimum indicates the earliest day when any machine at that location is likely to be scheduled for service if all the machines at that location are restocked immediately.

Repeat Step 420.1 until either one of the following conditions is true:

Condition 420.1-C1: The schedule is full. For example, if each machine is allocated a fixed amount of service time, and no other driving or servicing time is taken into account for the schedule generation, then the condition 420.1-C1 means that the Service List reaches the maximum number of machines to be serviced in one day. If this condition is true, terminate the step 420 and go to step 450 (FIG. 4).

Condition 420.1-C2: All the machines in the subroute are in the Service List. In this case, go to step 430 (FIG. 4).

Condition 420.1-C3: The subroute has unselected machines, but all of these machines have their DaysToService>MaxDays. In this case, proceed to Step 420.2.

Step 420.2: For each location 330 for which a machine was selected in the subroute at step 420.1, for each non-selected machine at that location, check for the following condition:

Condition 420.2-C1: The machine's DaysToService is less than Min(DaysToServiceFromRestock) for that location (see step 420.1). If this condition is true, add the machine to the Service List. (This condition indicates that the machine will reach its Empty Coils Threshold 520.1 before the next service would be scheduled for this location if all the machines at the location were restocked immediately.)

Note. In some embodiments, the machines satisfying the condition 420.2-C1 are added to the Service List in the order of the decreasing Points values. In other embodiments, the machines are added as they are examined, or in some other order. In other embodiments, before adding any machine to the Service List, the non-selected machines satisfying the condition 420.2-C1 from all the selected locations 330 are placed in a separate list. Then the machines on the separate list are added to the Service List in the order of the decreasing Points values. Other embodiments are also possible for machine selection.

When adding any machine to the Service List, check for the following conditions:

Condition 420.2-C1: The schedule is full (same as 420.1-C1 above). In this case, go to step 450 (FIG. 4).

Condition 420.2-C2: All the machines have been selected at all of the locations selected at step 420.1. In this case, go to step 430 (FIG. 4).

Step 420.3: This step is reached if there are still unselected machines at the locations 330 selected at step 420.1 but the schedule is not yet full. In this case, for the locations 330 selected at step 420.1, traverse the unselected machines, and for each unselected machine, add it to the Service List if (a) the machine will reach its Required Service Interval Threshold 520.3 on the Service Day (the day for which the schedule is being generated), and/or (ii) the machine has reached its Cash Threshold 520.4 (FIG. 5) or is projected to reach its Cash Threshold on the Service Period (this can be estimated using a daily average cash intake of the machine). In some embodiments, the machine is selected only if it both thresholds 520.3, 520.4 are reached or will be reached on the Service Period. In other embodiments, the machine is selected if it has reached or will reach any one or both of the two thresholds.

The Note to Step 420.2 applies also to step 420.3.

When adding any machine to the Service List, check for the following conditions:

Condition 420.3-C1: The schedule is full (same as 420.1-C1 above). In this case, go to step 450 (FIG. 4).

Condition 420.3-C2: There are no more machines to select at step 420.3. In this case, go to step 430 (FIG. 4).

End of Step 420

Step 440 (FIG. 4): Select Next Subroute

In some embodiments, this step is performed as follows. Let us denote the current subroute (the subroute for which the step 420 has just been executed) as S1. Then the subroutes that have not yet been selected are scanned to see if S1 is on their "Second To" list. Among all such subroutes, a subroute is selected with the maximum SubRoutePoints. If there are no subroutes that have not already been selected which have S1 on their Second To list, go to step 450.

End of Step 440

FIG. 12 illustrates exemplary data that can be provided to the user at step 450 on a computer monitor, a printer, or some other device 140D. The "Rankings" section lists the subroutes 320 in the order of decreasing service scheduling priorities (decreasing SubRoutePoints in this example as the Class indicator is not used). The Rank column is the subroute's order in this list. The Subroute column specifies the subroute ID and the subroute name. The "Total Points" column is the SubRoutePoints for each subroute. The "Average Points" column is SubRoutePoints divided by the number of the vending machines in the subroute. Some embodiments provide the median of the machines Points values in the subroute. "Max Days" is the subroute's MaxDays parameter. The "Second To" list is provided in the last column for each subroute. Some embodiments also indicate the subroute class.

Then the machines for each subroute are listed. Only an incomplete listing for only one subroute ("Orange County") is shown in FIG. 12. The first column contains check boxes that are checked for the machines on the Service List. The user can select other machines, or deselect machines, by checking and un-checking the boxes using input device 140i. The ID column is the machine IDs 508 (FIG. 5). The Location column is locations 330. The Prey column indicates the previous day that the machine is scheduled for service. This column is used if the schedule is generated in advance for multiple days. Suppose the user wants to generate the service schedules in advance for consecutive days d1, d2, d3. When the schedule is being generated for d2, it is assumed that the machines selected in the d1 schedule were restocked on day d1. If a machine is scheduled for service on day d1, then the d2 schedule display will show the day d1 in the Prey column for the machine. If the machine is later scheduled for service on day d3, and the d2 scheduling is redone, then the d2 schedule display will show d3 in the Next column. The "Empty Products" column is the EmptyCoils values. The Days column is the DaysToService values. The Last column is the last day the machine was restocked. The "From Today" column shows when the machine would need service if it were restocked today. Some of the columns are not displayed in some embodiments, and other information can be displayed as needed.

Additional features of some embodiments will now be described.

Sales Data Clean Up for Calculating the Inventory and Daily Average

In some embodiments, the sales data can be "cleaned up" by server 150 and/or client 140 when the inventory and daily average data are generated for FIG. 6. Shown in FIG. 13 are exemplary data structures in data base 120 and/or memory 140M and/or memory 150M used in some embodiments. For each vending machine coil, parameter "Par Level" (same as Stock Level in FIG. 6) indicates the inventory obtained when the vending machine is restocked. In the example of FIG. 13, the Par Level is 20 items. The vending machine periodically transmits the number of items sold from each coil. In some embodiments, the transmissions are every hour or some other period, but in the example of FIG. 13 the numbers are aggregated for each day (they could be aggregated for each Service Period other than a day). In FIG. 13, two items were sold on March 1 of 2000, four items on March 2, and two items on each of March 5 and March 6. There are no data available for March 3 and March 4, perhaps because the vending machine was broken and there were no sales, or perhaps because the data transmission was unsuccessful even though sales occurred. It is not clear if the data for March 5 is the accumulated sales for March 3 through March 5, or some invalid data. In some embodiments, the data for March 5 is ignored in computing the inventory and the daily average. The daily average is taken over March 1, 2, and 6 and is $(2+4+2)/3=2.67$. The inventory is calculated as $20-2-4-2=12$. In other embodiments, the March 5 data are not ignored, and assumed to be the sales data for that day. The daily average is calculated as $(2+4+2+2)/4=2.25$. The inventory is calculated as $20-2-4-2-2=10$. In other embodiments, the March 5 data are assumed to be cumulative for March 3 through March 5. The daily average is calculated as $(2+4+2+2)/6=1.67$, and the inventory is 10.

In FIG. 14, there are no sales data for the last two days, i.e. March 5 and March 6. Some embodiments assume that the sales proceeded as normal but the sales data transmission failed. The sales on each of March 5 and March 6 are assumed to equal the daily average figure as computed from the data for March 1 through March 4. The daily average is thus $(2+4+2+2)/4=2.5$. The inventory is $20-2-4-2-2-2.5-2.5=5$ (2.5 items are allocated for each of March 5 and March 6).

This technique can also be used for FIG. 13. Thus, in some embodiments, after the daily average is calculated by one of the techniques described above for FIG. 13, the same daily average is assumed for the sales on March 3 and March 4, and possibly for March 5. The daily average value is subtracted for each of these days to calculate the inventory.

In FIG. 15, the Par Level is 20, and the Alert Level is 2. Eighteen items are sold In March 1 through 3 $(6+10+2=18)$, so the machine did not sold anything from this coil after March 3. However, the machine's data transmissions indicate positive sales for March 4, 5, and 6. These sales data are ignored in some embodiments. The inventory is assumed to be $20-6-10-2=2$, and the daily average is calculated only over March 1 through March 3, and is $(6+10+2)/3=6$. Once the calculated inventory reaches the alert level or below, the later data are ignored in some embodiments.

In some embodiments, the same techniques are used to calculate DailyAverage for a given product rather than a coil.

The invention is not limited to the embodiments described above. For example, in some embodiments, the subroute selection operations at steps 410.3 (FIG. 7) and/or step 440 (FIG. 4) select the subroute with the maximum number of points per machine (i.e. SubRoutePoints divided by the number of machines 110 in the subroute) instead of SubRoutePoints. Further, in either case, the SubRoutePoints value can be modified in some way at step 410.2 (FIG. 7) to give a higher or lower priority to an individual subroute (for example, a constant number specified by the user can be added to or subtracted from SubRoutePoints). In some embodiments, the Points are defined so that the vending machines with lower Points have a higher priority. In some embodiments, the schedule is generated not for a Service Day but for a Service Period other than a day, such as a Service Hour, with a new schedule generated for each hour, or a four-hour period, or some other Service Period. Also, regardless of the length of the Service Period, one or more of the parameters Days To Empty, Days to Service, etc. can be replaced with Hours to Empty, Hours to Service, etc. Other time units can also be used.

The Days to Service parameter is an estimate for a time left until the time when the machine will need service (until the machine's "need-service" time). Days to Service can be defined as starting from any point, for example, from today until the need-service time, from tomorrow until the need-service time, or from any other time point. Also, the Days to Service estimate can be viewed as an estimate defining the need-service time itself. Alternatively, the estimated need-service time defines Days to Service. Other estimates can also be used that define the Days to Service time or the need-service time. The invention is not limited to any mathematical computations or expressions for estimating Days to Service, Days to Empty, or other parameters.

The relationships "less than" and "less than or equal to" are interchangeable.

For example, at step 420.1 in FIG. 11, the relationship

DaysToService≦MaxDays is equivalent to

DaysToService<MaxDays+1, so the "less than" relationship can be used to compute the "less than or equal to" relationship. The invention is not limited to any particular way to compute the "less than" or "less than or equal to" relationships, or "greater than" or "greater than or equal to" relationships, or other logical or arithmetic values. Also, MaxDays can be defined as incremented by 1. The invention can be practiced with the configuration of FIG. 1 but can also be practiced in other configurations. For example, the invention can be practiced without client/server interactions, without World Wide Web, or with networks other than the Internet. The invention is not limited to the particular steps of step sequences shown in the drawings. For example, in FIG. 8, steps 830 and 850 can be interchanged or performed in parallel. Also, step 810 can be performed for multiple vending machines before step 820 is performed for any of the machines. The invention includes manufactured articles such as computer readable storage media comprising computer instructions for causing processors 140P and/or 150P or other processors to implement the methods of the invention. The invention includes manufactured data signals, such as electromagnetic signals embodied in carrier waves, comprising computer instructions and/or data for implementing the methods of the invention. The invention includes data structures such as shown in FIGS. 5, 6, 10, 13-15, and other data structures, residing in a computer readable medium and/or embodied in a manufactured signal. Some or all of the functions can be hardwired rather than software programmable. Other embodiments and variations are within the scope of the invention, as defined by the appended claims.

The invention claimed is:

1. A system-implemented method for scheduling service for a plurality of vending machines to select those vending machines which are to be serviced in a predefined service period, the system comprising hardwired and/or software programmed circuitry, the method comprising operations of:
   (1) determining, by said circuitry, a service priority indicator of each of a plurality of vending machines;
   (2) determining, by said circuitry, a scheduling priority for each of a plurality of subroutes, each subroute being a set of one or more vending machines, at least one of the subroutes comprising a plurality of vending machines separated by driving times, wherein determining the scheduling priority of each subroute comprises adding, by said circuitry, the service priority indicators of the subroute's plural vending machines and determining the scheduling priority as a function of a sum of the service priority indicators of the subroute's vending machines;
   (3) selecting, by said circuitry, a subroute S1 for service by using the scheduling priorities, the subroute S1 being one of the plurality of the subroutes;
   (4) selecting, by said circuitry, one or more vending machines for service in the subroute S1 in said service period;
   wherein each vending machine which is not selected is deselected for service in said service period.

2. The method of claim 1 wherein the service priority for at least one of the plurality of vending machines is determined by said circuitry using an estimate E1 defining an estimated time until a "need-service time" which is a time when the vending machine will need-service, wherein the at least one of the vending machines comprises one or more product containers, the method comprising generating, by said circuitry, the estimate E1 by using one or more predefined service threshold parameters which define one or more of:
   (a) a threshold Th1 for a number of the product containers satisfying a condition C1 which is a condition that an amount of a product in the container is at most a predefined alert level for the container;
   (b) a threshold Th2 for a number of the products vended by the at least one of the vending machines that satisfy a condition C2 which is a condition that an amount of the product in the vending machine is at most a predefined alert level for the product;
   (c) a required service interval which is maximum time that the machine is to be allowed to operate without service;
   (d) a threshold for an amount of money in the vending machine.

3. The method of claim 2 wherein the one or more service threshold parameters comprise a first service threshold parameter which defines the threshold for the number of the machine's product containers satisfying the condition C1, wherein if a group of containers carries the same product, then only one container in the group is taken into account by said circuitry in generating the estimate E1.

4. The method of claim 3 wherein said one container in the group is a container that carries a maximum amount of the product among the containers in the group.

5. The method of claim 2 wherein the one or more service threshold parameters comprise a first service threshold parameter which defines the threshold Th1 or the threshold Th2; and
   wherein generating the estimate E1 comprises:
   (1) said circuitry determining, for each of a first plurality of the product containers or products, a corresponding value t1 which defines an estimated time until (i) the container will satisfy the condition C1 for the container's alert level or (ii) the product will satisfy the condition C2 for the product's alert level; and (2) for said first plurality of the containers or products, said circuitry determining a container or product which has an order corresponding to the threshold Th1 or Th2 in an ordering in which the containers or products are ordered by their increasing values t1;

wherein the estimate E1 is generated by said circuitry as the value t1 corresponding to the container or product determined in operation (2).

6. The method of claim 5 wherein said first plurality of containers or products is a plurality of containers which comprises, for each group of the containers that carry the same product, only a container that carries the maximum amount of said product.

7. The method of claim 1 wherein in the operation (1), each the vending machine's service priority indicator is determined by said circuitry using an estimate E1 defining an estimated time until a "need-service time" which is a time when the vending machine will need-service, and the method further comprises said circuitry generating the estimate E1 for each vending machine.

8. The method of claim 7 wherein each vending machine comprises a plurality of product containers, and each vending machine's estimate E1 is generated by said circuitry using one or more predefined service threshold parameters which define one or more of:

(a) a threshold Th1 for a number of the product containers satisfying a condition C1 which is a condition that an amount of a product in the container is at most a predefined alert level for the container;

(b) a threshold Th2 for a number of the products vended by the vending machine that satisfy a condition C2 which is a condition that an amount of the product in the vending machine is at most a predefined alert level for the product;

wherein the method further comprises said circuitry generating, for each vending machine, a corresponding estimate E2 with reference to (i) a number of the vending machine's containers that will satisfy the condition C1 at the need-service time defined by the corresponding estimate E1, or (ii) a number of the vending machine's products that will satisfy the condition C2 at the need-service time defined by the corresponding estimate E1;

wherein for each vending machine, its service priority indicator is also a function of the corresponding estimate E2.

9. The method of claim 8 wherein the estimate E2 is an estimate of the number of the vending machine's containers that will satisfy the condition C1 at the need-service time defined by the corresponding estimate E1, wherein if a group of containers carries the same product, then only one container in the group is taken into account in calculating the estimate E2.

10. The method of claim 8 wherein the service priority indicator is generated by said circuitry as a function which increases in E1 and decreases in E2, or decreases in E1 and increases in E2.

11. The method of claim 10 wherein the service priority indicator is a ratio F1/F2, wherein one of F1 and F2 is a predefined linear function of $E2^P$, wherein the other one of F1 and F2 is a predefined linear function of $E1^Q$, and P is less than Q.

12. The method of claim 11 wherein P=0.5 and Q=1.75.

13. The method of claim 1 further comprising, after selecting the vending machines, said circuitry selecting another subroute S2 which is one of the plurality of the subroutes, and said circuitry selecting one or more vending machines for service from the subroute S2.

14. The method of claim 1 wherein the service is to be performed in a predefined service period.

15. The method of claim 14 wherein in the operation (4), the vending machine selection is based on the service priority indicators and on whether or not a vending machine satisfies a condition Cond1 which is a condition that the service period precedes the vending machine's need-service time defined by the corresponding estimate E1 by more than a predefined amount;

wherein any vending machine have a lower priority for being selected if the vending machine satisfies the condition Cond1.

16. The method of claim 14 wherein the service period is insufficient for servicing all of the vending machines.

17. The method of claim 14 wherein the subroute S1 comprises a plurality of vending machines whose service priority indicators are used by said circuitry to select one or more vending machines in the operation (4).

18. The method of claim 1 wherein the subroutes are predefined before the operations (2)-(4).

19. The method of claim 1 wherein the subroute S1 comprises vending machines separated by driving times.

20. The method of claim 13 wherein each of the subroutes S1 and S2 comprises vending machines separated by driving times.

21. A system-implemented method for selecting vending machines for being serviced in a predefined service period, the system comprising hardwired and/or software programmed circuitry, the method comprising operations of:

(1) determining, by said circuitry, a scheduling priority for each of a plurality of predefined subroutes, each subroute being a set of one or more vending machines, at least one of the subroutes comprising a plurality of vending machines separated by driving times, wherein for at least the one of the subroutes comprising the plurality of vending machines, the scheduling priority incorporates information on states of more than one of the subroute's vending machines;

(2) said circuitry using the scheduling priorities to select one of the predefined subroutes for being serviced in the service period;

(3) said circuitry selecting one or more vending machines in the subroute selected in the operation (2) for being serviced in the service period;

(4) said circuitry repeating the operations (2), (3) as long as a service schedule for the service period is not full and there is a non-selected vending machine selectable for service in the operation (3), to select a new subroute in each iteration of the operation (2);

wherein at least two different iterations of the operation (2) result in selections of subroutes with respective two different scheduling priorities, and wherein less than all of the vending machines are selected by said circuitry for being serviced in the service period.

22. The method of claim 21 further comprising said circuitry obtaining data placing a restriction on an order in which the subroutes can be serviced in the service period, wherein:

the subroutes are scheduled by said circuitry to be serviced in an order of being selected in the operation (2); and each subsequent iteration of the operation (2) selects a subroute having the highest scheduling priority among the unselected subroutes not restricted by said restriction from being serviced after the selected subroutes in the service period.

23. The method of claim 21 further comprising said circuitry obtaining data placing a restriction on an order in which the subroutes can be serviced in the service period, wherein:

the subroutes are scheduled by said circuitry to be serviced in an order of being selected in the operation (2); and the first iteration of the operation (2) selects a subroute having the highest scheduling priority among the subroutes which are allowed by said data to be scheduled as the first to be serviced in the service period.

24. The method of claim 21 wherein in the operation (1), the scheduling priority for each subroute is determined by said circuitry as a decreasing function of each "need-service time" in the subroute, wherein each need-service time is associated with one of the subroute's vending machines and is an estimated time until the associated vending machine will need service.

25. The method of claim 24 wherein in the operation (3), the vending machine has a lower priority for being selected if the service period precedes the vending machine's need-service time by more than a predefined amount.

26. The method of claim 21 wherein the vending machines are located at a plurality of locations, and at least one location has more than one vending machines, and wherein selecting one or more vending machines for being serviced in the service period comprises:

said circuitry selecting vending machines according to one or more first selection rules for selecting and deselecting the vending machines;

for at least one location L1 comprising a vending machine VM1 selected by said circuitry according to the one or more selection rules and also comprising a vending machine VM2 deselected by said circuitry according to the one or more selection rules, said circuitry determining if one or more second selection rules apply to the machine VM2, and said circuitry selecting the machine VM2 if the one or more second selection rules apply.

27. The method of claim 26 wherein determining if the one or more second selection rules apply comprises said circuitry generating an estimate defining a time until an earliest time LT1 when any one of the vending machines at the location L1 will need service if all of the vending machines at the location L1 are serviced in the service period;

wherein the one or more second selection rules comprise a rule that the estimated need-service time of the vending machine VM2 be earlier than the time LT1.

28. The method of claim 26 wherein the one or more second selection rules comprise a rule that an amount of cash in the vending machine be at least a predefined threshold.

29. The method of claim 28 wherein the one or more second selection rules comprise a rule that a predefined required-service-interval for the machine expire on or before the service period.

30. The method of claim 21 wherein in the operation (1), each subroute's scheduling priority is computed by said circuitry as a function of a sum of the subroute's plural vending machines' service priority indicators.

31. The method of claim 21 wherein at least one subroute selected in the operations (2)-(4) comprises vending machines separated by driving times.

32. The method of claim 21 wherein the service schedule becomes full while there is still a non-selected vending machine selectable for service.

33. A manufacture operable to perform the method of claim 1.

34. A manufacture comprising a computer readable data medium comprising one or more computer instructions operable to cause a computer system to perform the method of claim 1.

35. The manufacture of claim 34 further comprising a computer-readable data structure for use in scheduling service for the plurality of vending machine subroutes such that the service is scheduled for each of a plurality of service periods and in each service period one or more subroutes are to be serviced, and in each service period in which more than one subroutes are serviced the subroutes are to be serviced in sequence one after another, each subroute being a set of one or more vending machines and the vending machines are to be serviced in the order of their respective subroutes in each said sequence, the data structure comprising:

a subroute identifier which identifies a subroute S1; and an indicator specifying whether or not, in each of the service periods, the subroute S1 can be serviced after another subroute.

36. The manufacture of claim 35 wherein said indicator comprises a list of one or more subroutes such that the subroute S1 can be serviced after any subroute S2 in the list in each of the service periods.

37. The manufacture of claim 35 wherein said indicator specifies one of the following three options:

Option 1: in each of the service periods, the subroute S1 cannot be serviced after any other subroute, and can only be serviced as the first serviced subroute;

Option 2: in each of the service periods, the subroute S1 can be the first serviced subroute and can also be serviced after another subroute in the;

Option 3: in each of the service periods, the subroute S1 cannot be serviced as the first serviced subroute and can only be serviced after another subroute.

38. A network transmission method comprising transmitting, over a network, a computer-readable data structure as recited in claim 35.

39. A manufacture operable to perform the method of claim 1.

40. A manufacture comprising a computer readable data medium comprising one or more computer instructions operable to cause a computer system to perform the method of claim 1.

41. A network transmission method comprising transmitting, over a network, a computer program operable to cause a computer system to perform the method of claim 1.

42. A manufacture operable to perform the method of claim 7.

43. A manufacture comprising a computer readable data medium comprising one or more computer instructions operable to cause a computer system to perform the method of claim 7.

44. A network transmission method comprising transmitting, over a network, a computer program operable to cause a computer system to perform the method of claim 7.

45. A manufacture operable to perform the method of claim 25.

46. A manufacture comprising a computer readable data medium comprising one or more computer instructions operable to cause a computer system to perform the method of claim 25.

47. A network transmission method comprising transmitting, over a network, a computer program operable to cause a computer system to perform the method of claim 25.

48. A manufacture operable to perform the method of claim 26.

49. A manufacture comprising a computer readable data medium comprising one or more computer instructions operable to cause a computer system to perform the method of claim 26.

50. A network transmission method comprising transmitting, over a network, a computer program operable to cause a computer system to perform the method of claim 26.

51. A manufacture operable to perform the method of claim 21.

52. A manufacture comprising a computer readable data medium comprising one or more computer instructions operable to cause a computer system to perform the method of claim 21.

53. A network transmission method comprising transmitting, over a network, a computer program operable to cause a computer system to perform the method of claim 21.

54. A network transmission method comprising transmitting, over a network, a computer program operable to cause a computer system to perform the method of claim 1.

55. A manufacture operable to perform the method of claim 22.

56. A manufacture comprising a computer readable data medium comprising one or more computer instructions operable to cause a computer system to perform the method of claim 22.

57. A network transmission method comprising transmitting, over a network, a computer program operable to cause a computer system to perform the method of claim 22.

58. A manufacture operable to perform the method of claim 23.

59. A manufacture comprising a computer readable data medium comprising one or more computer instructions operable to cause a computer system to perform the method of claim 23.

60. A network transmission method comprising transmitting, over a network, a computer program operable to cause a computer system to perform the method of claim 23.

61. A manufacture operable to perform the method of claim 13.

62. A manufacture comprising a computer readable data medium comprising one or more computer instructions operable to cause a computer system to perform the method of claim 13.

63. A network transmission method comprising transmitting, over a network, a computer program operable to cause a computer system to perform the method of claim 13.

64. A manufacture operable to perform the method of claim 19.

65. A manufacture comprising a computer readable data medium comprising one or more computer instructions operable to cause a computer system to perform the method of claim 19.

66. A network transmission method comprising transmitting, over a network, a computer program operable to cause a computer system to perform the method of claim 19.

67. A manufacture operable to perform the method of claim 20.

68. A manufacture comprising a computer readable data medium comprising one or more computer instructions operable to cause a computer system to perform the method of claim 20.

69. A network transmission method comprising transmitting, over a network, a computer program operable to cause a computer system to perform the method of claim 20.

* * * * *